United States Patent Office 2,719,178
Patented Sept. 27, 1955

2,719,178

VAPOR PHASE METHOD OF PRODUCING N-SUBSTITUTED ACRYLAMIDES

Harry W. Coover, Jr., and Newton H. Shearer, Jr., Kingsport, Tenn., assignors to Eastman Kodak Company, Rochester, N. Y., a corporation of New Jersey No Drawing. Application January 7, 1953, Serial No. 330,158

7 Claims. (Cl. 260—562)

The present invention relates to the preparation of N-substituted acrylamides. More particularly the invention is concerned with the conversion of N-substituted-$\beta$-N-substituted aminoamides into N-substituted acrylamides by catalytic pyrolysis in the vapor phase.

It is known that N-alkyl-$\beta$-N-alkylaminopropionamides may be converted to N-substituted acrylamides by liquid phase reactions in the presence of an acidic material which forms a stable amine salt with a primary or secondary amine. The liquid phase reaction normally is carried out at a temperature from about 100° to 250° C. with an acidic material such as sulfuric acid, hydrochloric acid, phosphoric acid, ammonium acid sulfate, a sulfonic acid, hydrobromic acid or the like. Obviously the liquid phase reaction involving the incorporation of sufficient acidic material to form the amine salt has definite limitations as far as large scale production of N-substituted acrylamides is concerned.

It is an object of the present invention to provide an improved process for commercial operation in which the conversion may be carried out in the vapor phase.

We have discovered that it is possible to obtain the conversion of N-alkyl-$\beta$-N-alkyl-aminopropionamides directly to the corresponding $\alpha,\beta$-unsaturated amides having N-alkyl substituents without the use of a salt-forming acidic material. In accordance with our invention, pyrolysis of vaporized N-alkyl-$\beta$-N-alkylaminopropionamide is conducted at temperatures of 300° to 550° C. for a reaction period of less than ten seconds in the presence of a suitable catalyst and with or without a diluent. The reaction may be represented by the following equation:

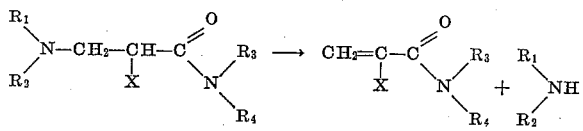

wherein $R_1$=hydrogen, alkyl or aryl
$R_2$=alkyl or aryl
$R_3$=hydrogen, alkyl or aryl
$R_4$=alkyl or aryl
X=hydrogen or methyl The invention is illustrated in the following examples:

Example 1.—N-methylmethacrylamide

N-methyl-$\beta$-N-methylaminoisobutyramide and an equimolar quantity of nitrogen were passed over an alumina-silica catalyst (Universal Oil Products Company type A cracking catalyst) at a temperature of 450° with a contact time of five seconds. The product was quickly distilled at reduced pressure after addition of hydroquinone (0.1 percent) to separate the N-methyl-methacrylamide boiling at 70–72° at 1 mm. Basic impurities were removed from the product by washing a benzene solution of the crude product with a saturated aqueous salt solution containing 2 percent hydrochloric acid, subsequently with a salt solution containing 3 percent sodium hydroxide, drying, and redistillation.

Example 2.—N,N-dimethylmethacrylamide

The procedure of Example I was followed using N,N-dimethyl-$\beta$-N,N-dimethylaminoisobutyramide over alumina at 550° with a contact time of one second. The product was recovered by distillation.

Example 3.—N-isopropylacrylamide

The procedure of Example I was followed using N-isopropyl-$\beta$-N-isopropylaminopropionamide over a vanadia-aluminacatalyst at 350° C. with a contact time of seven seconds. The catalyst was a composition comprising approximately 10% by weight of vanadium pentoxide supported on alumina.

Example 4.—N-cyclohexylacrylamide

The procedure of Example 1 was followed using N-cyclohexyl-$\beta$-N-cyclohexylaminopropionamide over alumina at 450° with a four second contact time.

Example 5.—N-phenylacrylamide

The procedure of Example 1 was followed using N-phenyl-$\beta$-N-anilinopropionamide over alumina at 500° with a contact time of four seconds.

Example 6.—N-methylmethacrylamide

An evacuator and manostat were connected to the end of a pyrolysis tube so as to maintain the pressure at 180 mm. Then, N-methyl-$\beta$,N-methylaminoisobutyramide was passed through a preheater section of the tube maintained at 300° C. and over UOP type A cracking catalyst (alumina-silica) at a temperature of 300° C. with a contact time of 2 seconds. The product was distilled at reduced pressure after addition of 0.1% hydroquinone. Both the conversion and the yield of distilled N-methylmethacrylamide were 89%. No starting material was obtained and only a very minor amount of high boiling residue appeared. The small amounts of impurities contained in the distilled N-methylmethacrylamide were readily removed by passing a 40% aqueous solution of the monomer first over a cation exchange resin, and then over an anion exchange resin.

As is well known, the N-alkyl-$\beta$-N-alkylaminopropionamides employed in this invention are readily obtainable for example by the reaction of a primary or secondary alkylamine with an acrylic ester. The products of the reaction of our invention are useful polymeric intermediates, and are particularly valuable in the formation of copolymers and graft polymers of unique properties.

The catalysts advantageous in the present invention are quite varied in nature and may be basic, neutral, or acidic. Most suitably, the catalyst is employed in the form of lumps or pellets. The preferred catalysts are alumina-containing substances, inclusive of Vanadia-alumina (e. g. Harshaw Chemical Company catalyst V–223), alumina-silica (Universal Oil Products Company type A cracking catalyst), and aluminum phosphate-alumina. Also suitable are silica gel alone, activated alumina lumps alone, Berl saddles, copper tinsel, and pyrex Raschig rings. However, Berl saddles, copper tinsel, and pyrex Raschig rings are not preferred, since with these materials longer contact times must be used in conjunction with higher temperatures. This results in a lower yield of the N-substituted acrylamides and higher conversions to high boiling residue.

Excellent results may be obtained by operating this process at reduced pressures, as well as at atmospheric pressure. The operation of the process at reduced pressure is illustrated by Example 6. The preferred reduced pressure range is 150–250 mm. The reaction temperature may be varied within the range of 300–550° C. It preferably is correlated to the reaction period, which latter preferably is 1–7 seconds, so that at lower temperatures within the defined range, the higher reaction periods within the defined range should be employed and vice versa.

We claim:

1. A method of producing N-methylmethacrylamide which comprises heating N-methyl-$\beta$-N-methylaminoisobutyramide in the vapor phase at a temperature within the range of 300–550° C. for a reaction period of less than about ten seconds in the presence of alumina-silica to form methyl amine and N-methylmethacrylamide, and recovering the latter.

2. A method of producing N,N-dimethylmethacrylamide which comprises heating N,N-dimethyl-$\beta$-N,N-dimethylaminoisobutyramide in the vapor phase at a temperature within the range of 300–550° C. for a reaction period of less than about ten seconds in the presence of alumina.

3. A method of producing N-isopropylacrylamide which comprises heating N-isopropyl-$\beta$-N-isopropylaminopropionamide in the vapor phase at a temperature within the range of 300–550° C. for a reaction period of less than about ten seconds in the presence of vanadia-alumina.

4. A method for producing N-cyclohexylacrylamide which comprises heating N-cyclohexyl-$\beta$-N-cyclohexylaminopropionamide in the vapor phase at a temperature within the range of 300–550° C. for a reaction period of less than about ten seconds in the presence of alumina.

5. A method of producing N-phenylacrylamide which comprises heating N-phenyl-$\beta$-N-anilinopropionamide in the vapor phase in the presence of alumina at a temperature within the range of 300–550° C. for a reaction period of less than about ten seconds.

6. A continuous method for producing an N-substituted acrylamide of the formula

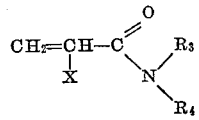

wherein X is a member of the group consisting of hydrogen and the methyl radical, $R_3$ is a member of the group consisting of hydrogen and lower alkyl radicals and $R_4$ is a member of the group consisting of lower alkyl, cyclohexyl and phenyl radicals which comprises the steps of passing an N-substituted-$\beta$-N-substituted-aminopropionamide of the formula

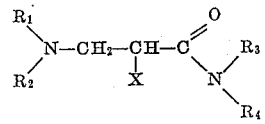

wherein $R_1$ is a member of the group consisting of hydrogen and lower alkyl radicals, $R_2$ is a member of the group consisting of lower alkyl, cyclohexyl, and phenyl radicals, and $R_3$, $R_4$ and X are as defined above, in the vapor phase in contact with a catalyst selected from the group consisting of alumina, aluminum phosphate-alumina, alumina-silica and vanadia-alumina heated to a temperature in the range of about 300°–550° C. for a period of less than about ten seconds and recovering the N-substituted amide from the gaseous reaction products thus formed.

7. A method as defined in claim 6 comprising the step of contacting N-substituted-$\beta$-N-substituted-aminopropionamide with the catalyst at a reduced pressure within the range of about 150–250 mm. of mercury.

References Cited in the file of this patent

UNITED STATES PATENTS

| | | |
|---|---|---|
| 2,451,436 | Erickson | Oct. 12, 1948 |
| 2,534,585 | Erickson | Dec. 19, 1950 |
| 2,576,106 | Cusic | Nov. 27, 1951 |
| 2,580,411 | Cusic | Jan. 1, 1952 |

OTHER REFERENCES

Lofgren, "Arkiv for Kemi, Mineralogi, o Geologi," vol. 22A (1946), page 7.

Lofgren et al., "Svensk. Kem. Tid," vol. 58 (1946), page 210.

Euler et al., "Liebigs Annalen," vol. 520 (1935), page 9.